March 6, 1945.    J. E. SHEPHERD    2,370,692
PHASE ANGLE INDICATOR
Filed Jan. 22, 1941    4 Sheets-Sheet 1
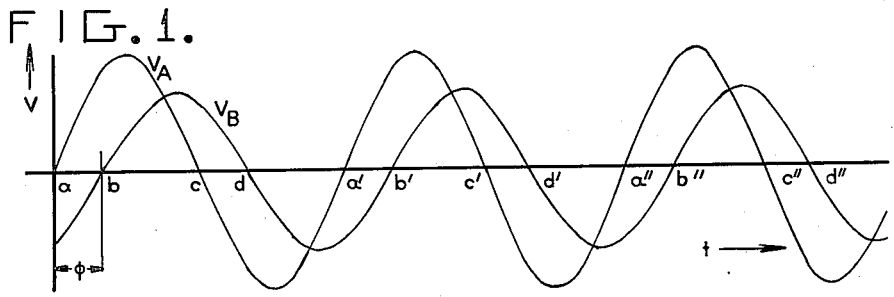
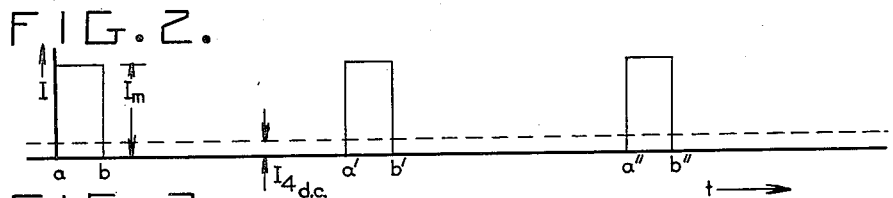
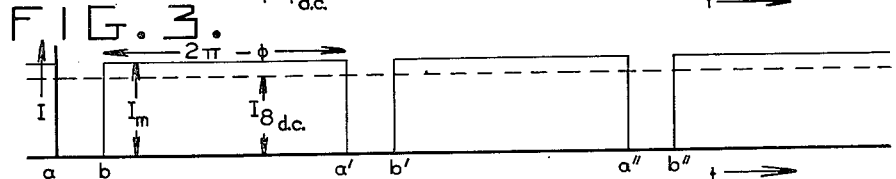
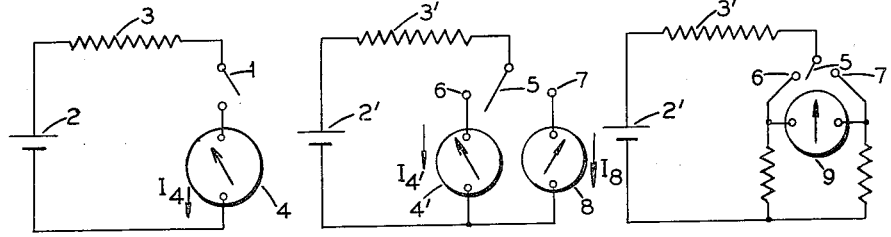
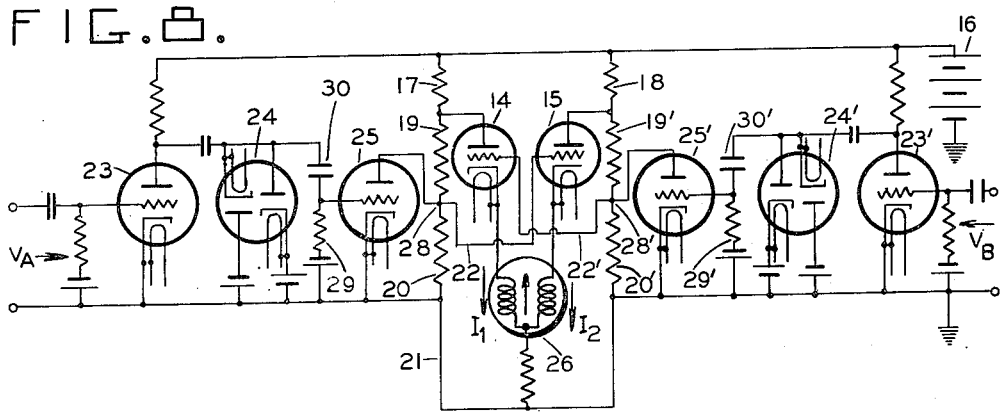
INVENTOR
JAMES E. SHEPHERD
BY
HIS ATTORNEY

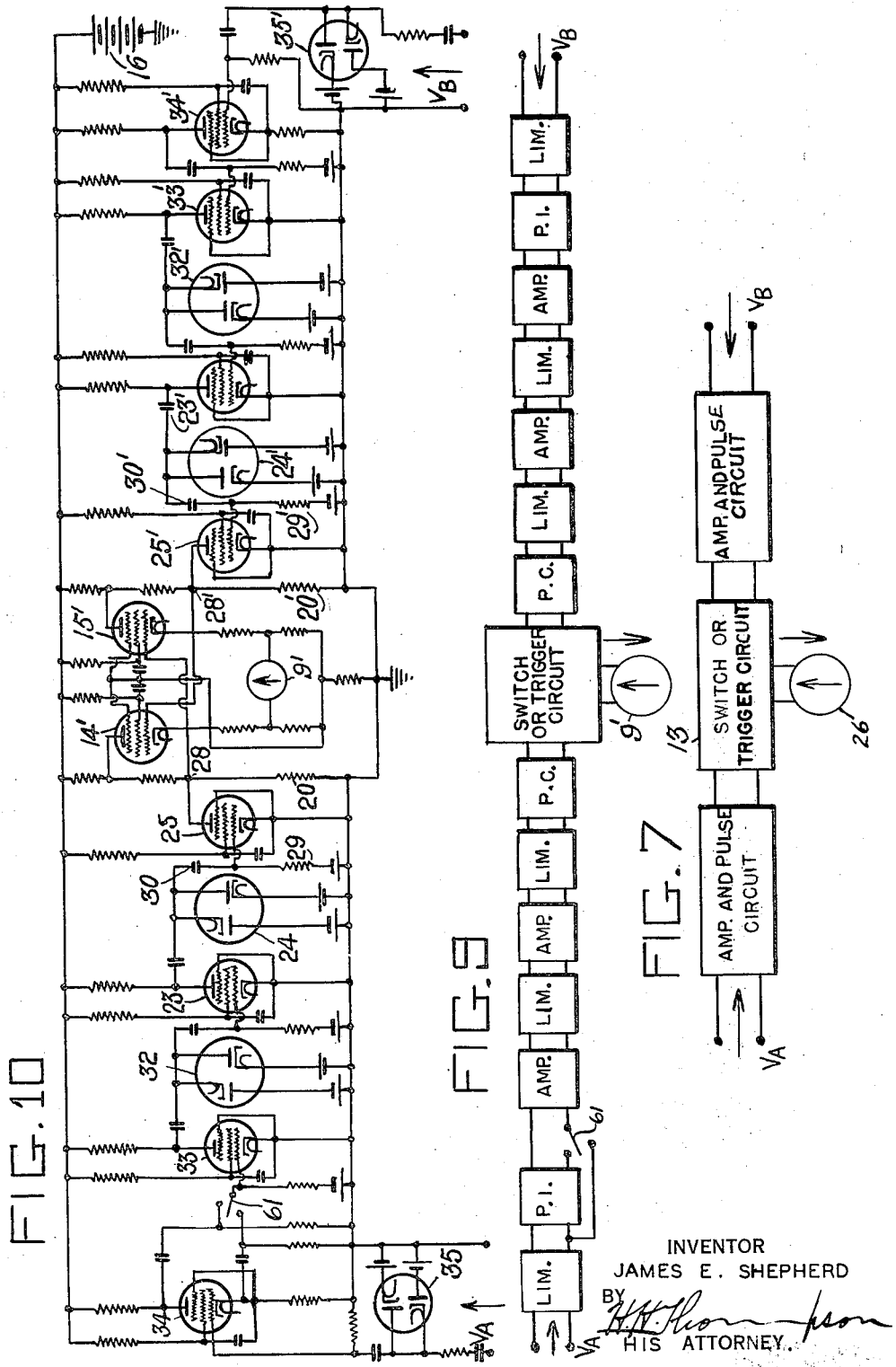

March 6, 1945.  J. E. SHEPHERD  2,370,692
PHASE ANGLE INDICATOR
Filed Jan. 22, 1941  4 Sheets-Sheet 3
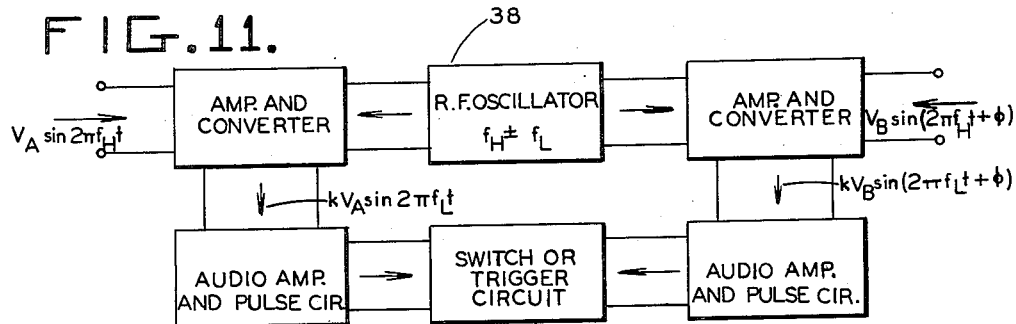
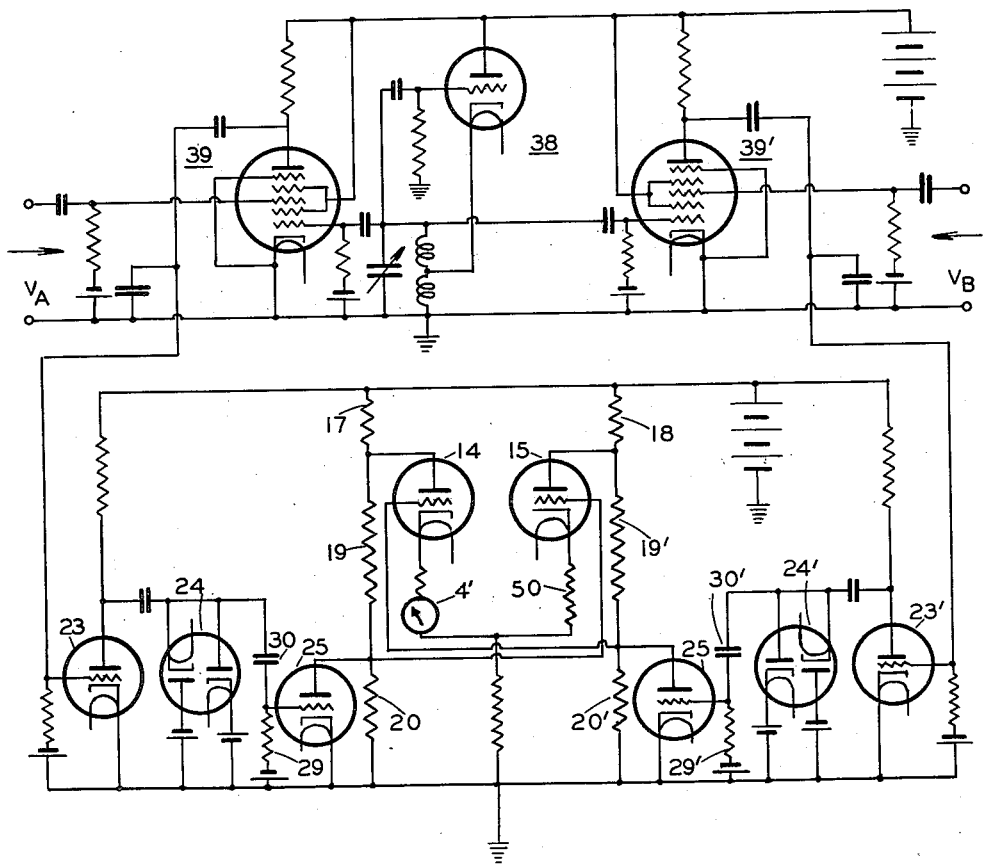
INVENTOR
JAMES E. SHEPHERD
BY Herbert H. Thompson
HIS ATTORNEY.

March 6, 1945.  J. E. SHEPHERD  2,370,692

PHASE ANGLE INDICATOR

Filed Jan. 22, 1941  4 Sheets-Sheet 4

INVENTOR
JAMES E. SHEPHERD
BY
Herbert H. Thompson
HIS ATTORNEY

Patented Mar. 6, 1945

2,370,692

UNITED STATES PATENT OFFICE 2,370,692

PHASE ANGLE INDICATOR

James E. Shepherd, Cambridge, Mass.

Application January 22, 1941, Serial No. 375,373

28 Claims. (Cl. 172—245)

The present invention relates, generally, to a novel apparatus and method for measuring the phase angle between two alternating or periodic electrical potential differences or voltages, or the phase angle between two periodic quantities of any type which can be converted into periodic electrical waves, and the invention has reference, more particularly, to a novel phase angle or time interval indicator for accomplishing such measurements.

Methods heretofore generally used for measuring phase angle may be divided into two classes, firstly, those which require a balancing operation to secure a null or other indication and, secondly, those which read phase angle directly on a meter or other indicating instrument. Several types of the first or balancing method have been used. For example, in the so-called alternating current potentiometer method, the magnitudes of the real and quadrature components of the reference voltage are each adjusted so that their vector sum equals the test voltage in both magnitude and phase. Another balance method requires that some sort of phase shifting circuit be introduced into either the test or reference channel of the measuring circuit and adjusted for equality of phase in the two channels. In this method, the phase angle is then calculated from the known circuit constants and the applied frequency. These methods, and other similar methods, have the disadvantages that each reading requires an operation by the attendant and also that the calibration of the instrument is a function of the applied frequency. Methods of this type can be made self-balancing only by costly and complicated systems of motors or other electro-mechanical transducers, relays, and other incidental mechanical arrangements.

When considering the potential difference, or voltage, between two points, which varies sinusoidally with time, one is free to choose arbitrarily the origin of the time axis, so that this potential difference or voltage is completely described by the equation $$v_A = V_A \sin 2\pi f t \qquad (1)$$

where $v_A$ is the instantaneous value of this voltage, $V_A$ the peak value, and $f$ the frequency of alternation, the time origin having been chosen as the point where $v_A$ is zero. A second voltage of the same frequency and referred to the same time origin may be completely described by the equation $$v_B = V_B \sin (2\pi f t - \phi) \qquad (2)$$

where $\phi$ is the fractional part of a complete cycle of alternation by which corresponding portions of the curves described by (1) and (2) are separated. Either voltage may be used as a reference voltage from which the other is measured. For the purpose of the present description, $V_A$ will be used to denote the reference voltage and $\phi$ will be defined as the phase angle by which the voltage under test, or the test voltage, $V_B$, differs from $V_A$.

Prior methods which renders a continuous reading of phase angle on a meter usually depend for their operation on a meter reading which is proportional to the magnitude of the sum of or difference between the test voltage and the reference voltage. If the two voltages are added, the following conditions apply, where $v_m$ is proportional to the voltage applied to the meter:

$$v_m = V_A \sin 2\pi f t + V_B \sin (2\pi f t - \phi) \qquad (3)$$

$$= \sqrt{V_A^2 + V_B^2 + 2V_A V_B \cos \phi} \sin (2\pi f t + \theta) \qquad (4)$$

where $$\theta = \tan^{-1}\left(\frac{V_B \sin \phi}{V_A + V_B \cos \phi}\right)$$

Thus the magnitude of the meter reading is given by $$|V_m| = \sqrt{V_A^2 + V_B^2 + 2V_A V_B \cos \phi} \qquad (5)$$

Therefore, the magnitude of the meter reading is a function of the magnitude of both the test and the reference voltage and of the phase angle between them. The meter can be calibrated in terms of phase angle only if the magnitudes of both voltages are held constant at some predetermined values. If the magnitudes of both $V_B$ and $V_A$ are held equal to the previously predetermined value $V_x$, then the expression for the magnitude of the meter reading simplifies to $$|V_m| = \left|2V_x \cos \frac{\phi}{2}\right| \qquad (6)$$

If the test and reference voltages are subtracted rather than added, the corresponding expression for the meter reading becomes $$|V_m| = \left|2V_x \sin \frac{\phi}{2}\right| \qquad (7)$$

In addition to the difficulty of maintaining both voltages equal and/or constant under all conditions, methods of this type have the following disadvantages: (1) the reading is ambiguous as to quadrant, i. e., +15 degrees renders the same meter reading as −15 degrees (or +345 degrees), and (2) because of the sine or cosine law relating the meter reading to the phase angle, a large portion of the entire cycle is crowded into a small region of the meter scale, resulting in high orders of inaccuracy for a large fraction of angular readings. For example, 20 per cent of the phase angle readings are crowded into 5 per cent of the meter scale, and 9 per cent of the phase angle readings are crowded into 1 per cent of the meter scale. As a consequence, a large portion of the phase angle readings are necessarily inaccurate. In addition, a specially calibrated meter scale is required.

The principal object of the present invention is to provide a novel method and apparatus for measuring phase angles that overcomes the above serious defects of prior devices, the said apparatus producing an electrical signal which is linearly proportional to the phase angle and which may be, therefore, applied to any direct current meter or other indicating or recording device or servo mechanism to enable direct and continuous observation and/or recording of the phase angle between two alternating electrical potentials, voltages, or other quantities capable of being converted into electrical waves.

Another object of the present invention is to provide a novel phase angle indicator whose reading is substantially independent of wide variations in the magnitude or wave shape of either or both of the impressed voltages.

Still another object of the invention lies in the provision of a novel phase angle indicator wherein the instrument calibration is independent of frequency over a very frequency range, such, for example, as the entire audio range.

Yet another object of the invention is to provide a novel phase angle indicator whose indications are not ambiguous as to quadrant, i. e., each meter reading uniquely defines one and only phase angle and each phase angle produces one and only one position of the indicating meter.

Other objects and advantages will become apparent from the specification, taken in connection with the accompanying drawings wherein the invention is embodied in concrete form.

In the drawings,

Fig. 1 shows two representative voltages whose phase difference is to be measured by the apparatus and method of this invention.

Fig. 2 is a curve showing the meter current as a function of time.

Fig. 3 shows a curve similar to that of Fig. 2.

Figs. 4, 5 and 6 are schematic wiring diagrams used for explaining the principles of the invention.

Fig. 7 is a block diagram of one form of the invention.

Fig. 8 is a wiring diagram conforming to the block diagram of Fig. 7.

Fig. 9 is a block diagram of a more complete form of the invention.

Fig. 10 is a wiring diagram of Fig. 9.

Fig. 11 is a block diagram showing the apparatus employed for measuring the phase angle between two radio frequency voltages.

Fig. 12 is a wiring diagram conforming to the structure of Fig. 11.

Similar characters of reference are used in all of the above figures to indicate corresponding parts.

Figure 13:
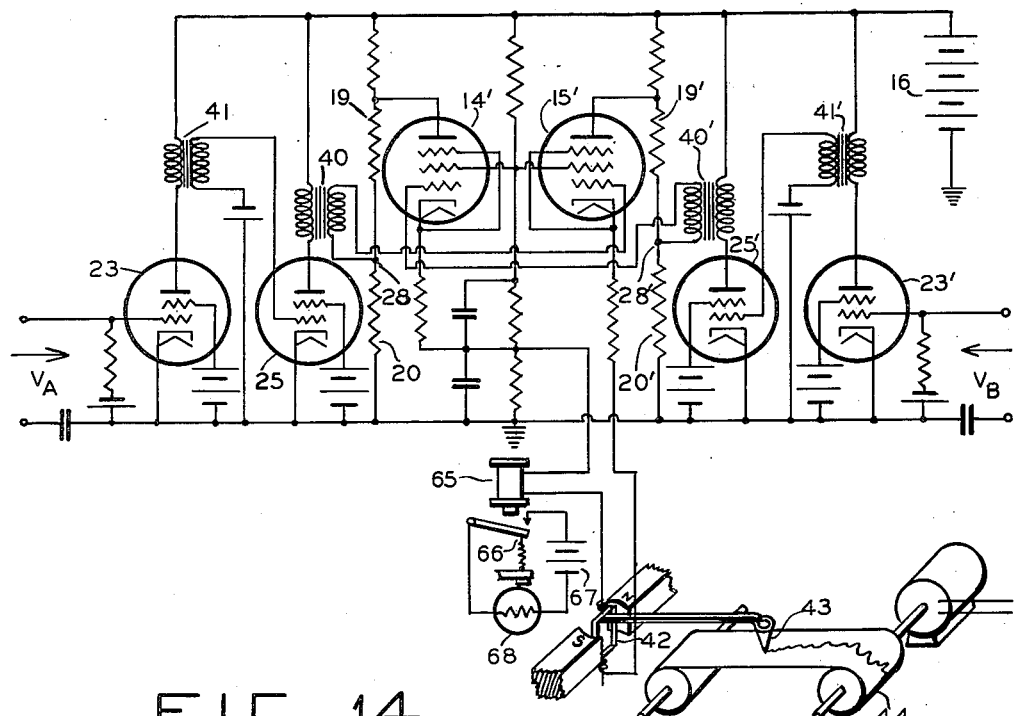
Fig. 13 is a wiring diagram of a modified arrangement.

Referring now to Fig. 1, there are shown two curves $V_A$ and $V_B$ which represent the variation of the voltages $V_A$ and $V_B$ as a function of time and as defined by Equations 1 and 2. The phase angle $\phi$ shown in the figure defines the time angle between any two corresponding points in the two curves and which may most conveniently be taken as the points at which the curves cross the time axis in one direction, for example, positively, as shown by the points $a$, $b$, $a'$, $b'$, $a''$, $b''$ in Fig. 1. The present device is in no way restricted to sinusoidal or alternating waves and may be used for measuring the phase angle between, or time delay between corresponding portions of, any two periodic waves having the same frequency such as, for example, periodic pulse waves. The method of this invention operates on the principle of switching on a fixed current $I_m$ each time one of the voltages passes a definite point in the cycle, for example, crosses the time axis going positive, and switching this current off again when the other voltage passes the corresponding point in its cycle.

Fig. 2 shows a curve corresponding to this fixed current as a function of time and the simplest circuit for accomplishing such a result is illustrated in Fig. 4. In the diagram of Fig. 4, the switch 1 is closed each time the voltage $V_A$ crosse the axis going in the positive direction, i. e., at points $a$, $a'$, $a''$, etc., and this switch 1 is opened each time voltage $V_B$ crosses the time axis going in a positive direction, i. e., at points $b$, $b'$, $b''$, etc., this switching being done by means not as yet described. With the switch closed, the fixed current $I_m$ from the battery 2 flows through resistor 3 and the direct current meter 4. This current is a function only of the steady battery voltage E and the series resistance in the circuit illustrated by resistor 3. The reading of meter 4 is proportional to the average current through it, which is the maximum current multiplied by the fraction of time it flows. Hence $$I_4 = I_m \frac{\phi}{2\pi} = \frac{E}{2\pi R_3}\phi \qquad (8)$$

wherein $I_4$ is the reading of meter 4 and $R_3$ is the resistance of 3, and E is the battery voltage. Thus, it will be seen that the meter reading is proportional only to the phase angle $\phi$ and other factors which remain fixed and are not a function of either the test or reference voltages. Furthermore, Equation 8 shows that the meter indication is linearly proportional to the phase angle. Still further, it will be noted that the frequency of operation is of no consequence except insofar as it may affect the accuracy of the switching operation and/or render the effect of the residual circuit reactances appreciable, since the average current is proportional to the fraction of time the switch is closed and not dependent on the frequency of closing. Thus, by such a device, all of the main advantages of this method are realized.

Another switching arrangement may be used if desired. Thus, for example, in Fig. 5 the switch 5 may be closed to engage either contact 6 or contact 7. If this switch is closed to engage contact 6 each time $V_A$ crosses the axis going positive and closed to position 7 each time the voltage $V_B$ similarly crosses the axis, then the current through meter 4' is similar to that through meter 4 of Fig. 4, while the current through meter 8 behaves in a complementary sense as indicated by the curve in Fig. 3, which curve illustrates the time variation of the current through meter 8. The indication of meter 8 is thus proportional to $2\pi-\phi$, or $\phi'$, where $\phi'$ is the phase angle of $V_A$ measured with respect to $V_B$ as a reference voltage. In the diagram shown in Figs. 4 and 5, meters 4 and 4' read near zero for very small values of $\phi$ and the meter reading increases lineally as $\phi$ increases positively up to the point at which $\phi$ is very nearly 360° or $2\pi$ radians, where $\phi$ is defined as by Equation 2. At this point the meter reading corresponds to that for $I_m$. This fact permits easy self calibration of instruments designed on this principle.

With the switch 5 left in engagement with contact 6, the resistance 3' or the battery 2' may be varied until the meter 4' needle reads 360 or $2\pi$ or some convenient multiple or sub-multiple of 360, or $2\pi$, and the meter readings can then be easily converted into degrees or radians. For phase angles larger than $2\pi$ radians, the indicator returns to a position near zero and increases again as $\phi$ is further increased. Consequently the meter reading will actually be proportional to $\phi \pm 2n\pi$, where $n$ is the number of complete cycles by which $V_A$ and $V_B$ differ.

Referring now to meter 8, small values of $\phi$ are read near the full scale on this meter and the meter indication decreases toward zero as $\phi$ increases toward $2\pi$. It is also possible in effect to let the currents $I_{4'}$ and $I_8$, passing through meters 4' and 8, to flow reversely through the winding of a meter 9, as shown in Fig. 6. A zero center meter is suitable for this purpose, the zero corresponding to 180°. Phase angles greater than 180° cause the needle to swing to one side, while phase angles less than 180° cause the needle to swing to the other side. Merely by reversing either of the voltages at the point where it is connected to the phase measuring instrument, the center of the scale becomes zero degrees phase angle with positive angles to one side and negative angles to the other side of zero.

In their simplest form, the switches 1 and 5 of Figs. 4 to 6 are simply mechanical relays operated by two other relays, one controlled by the test voltage and the other controlled by the reference voltage. For most purposes, however, the most useful and practical form of this instrument requires switching action taking place at a higher rate than that obtainable with mechanical relays. For this purpose electronic switching is found useful, a typical arrangement being illustrated in the block diagram in Fig. 7, wherein the indicating instrument 26 is operated by current waves of the nature of those indicated in Figs. 2 and 3, supplied by an electronic switching or trigger circuit, this circuit being switched as from contacts 6 and 7, as in Figs. 5 and 6, by means of impulse circuits which in turn are operated by the test and reference voltages, either or both voltages being amplified by amplifiers which control pulse circuits which in turn operate the trigger or switching circuit 13.

Figure 14:
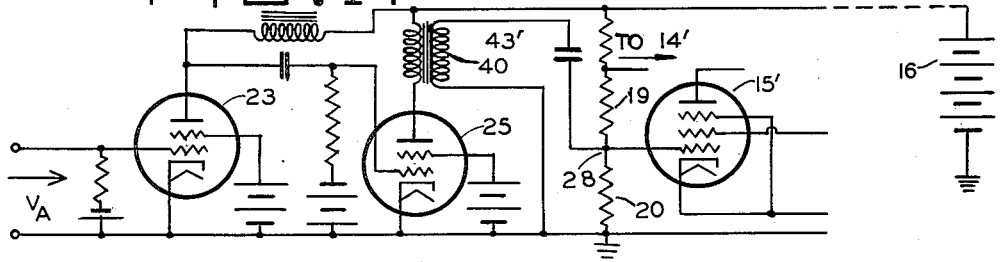
Figs. 14 and 15 are details of alternative structures that may be used in Fig. 13.
Figure 15:
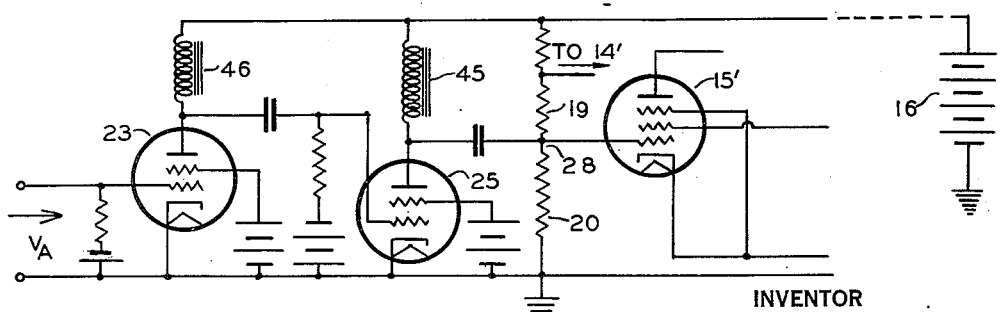

Fig. 8 illustrates the wiring diagram conforming to the structure of Fig. 7, this circuit of Fig. 8 having been actually used by applicant and found to be highly satisfactory. In Fig. 8, 14 and 15 are the switching or trigger tubes, the grid bias circuits of which tubes are a modification of the W. H. Eccles and F. W. Jordan circuit described on pages 143-146 of Radio Review, 1919, vol. I. Tubes 14 and 15 are preferably high vacuum tubes and may be either triodes or multi-grid tubes such as pentodes, as illustrated in Fig. 10. The plates of tubes 14 and 15 are supplied from battery 16 through resistances 17 and 18. Additional resistances 19 and 20 are included between the plate of tube 14 and ground lead 21, whereas additional resistances 19' and 20' are included between the plate of tube 15 and the ground lead. The grid of tube 15 is connected by lead 22 to the point of connection 28 of resistances 19 and 20, whereas the grid of tube 14 is connected by lead 22' to the point of connection 28' of resistances 19' and 20'. Reference voltage $V_A$ is applied to an amplifier tube 23, whereas the test voltage $V_B$ is applied to amplifier tube 23'. Amplifier tube 23 feeds into a voltage limiter 24, which in turn is connected to the grid of a tube 25 of a pulse circuit including condenser 30 and resistance 29, the plate of which tube is connected to the common point 28 of resistances 19 and 20. Similarly, the output of amplifier tube 23' is limited by the limiter tube 24', the output of which is applied to the grid of pulse circuit tube 25', whose plate is connected to the common point 28' of resistances 19' and 20'. A differential meter 26 is shown in Fig. 8 in lieu of the meters of Fig. 5 or the meter arrangement of Fig. 6.

Differential meter 26 is shown as having a pair of windings which are preferably on a common armature so that the net indication will be proportional to the difference of the currents through these two windings. This instrument will therefore give an indication similar to that provided for in the structure of Fig. 6, which latter structure could be used in Fig. 8, if desired. Also, if desired, two meters such as shown in Fig. 5 could be used in Fig. 8, in which case the respective meter readings would depend upon the respective currents $I_1$ and $I_2$. If the rotors of meters 4' and 8 were fixed to the same shaft, then the indication would be similar to that of the differential meter 26. Further, instead of using a differential meter or the meter arrangements of Figs. 5 and 6, I may substitute a resistance for either of the meters of Fig. 5 or Fig. 8, allowing the desired current $I_1$ or $I_2$, as the case may be, to pass through the winding of the meter retained so that this meter will indicate values of $I_4$ in Fig. 2 or $I_8$ in Fig. 3, whichever is desired. Such a structure is illustrated in Fig. 12.

In operation of the structure of Fig. 8, when valve 14 is passing current, the action is similar to the closing of switch 5 against contact 6 in Fig. 6, and when valve 15 is passing current, the action is similar to closing switch 5 against contact 7 in Fig. 6. Since in the particular case illustrated by Fig. 8, each $v_A$ and $v_B$ is subjected to a single phase reversal by valves 23 and 23' before operating the voltage limiter and pulse circuits, it must be remembered in the following discussion that when the alternating component of the amplified $v_A$ at the plate of valve 23 is crossing the axis from the negative to the positive side, as indicated by point $a$ of Fig. 1, the actual $v_A$ applied to the grid of valve 23 is crossing the axis in the opposite direction. In order to simplify the correlation between the action of Fig. 8 with the operations diagrammed in Figs. 1 to 6, we shall define the $v_A$ and $v_B$ of Fig. 1 as the voltages at the plates of valves 23 and 23', respectively. Thus, when the amplified $v_A$ at the plate of valve 23 is about to cross the axis in the positive direction, as at point $a$ of Fig. 1, the biased diodes of the voltage limiter have no effect on the portion of the wave for a short interval in the region of point $a$, and a relatively large positive rate of change of voltage is transmitted by means of condenser 30 of the pulse circuit to the grid of the pulse valve 25, thereby causing plate current to flow through valve 25 and hence lowering the potential of point 28. This action causes the positive grid voltage of valve 15 (carrying current just previous to point $a$ while valve 14 was off) to be lowered, reducing the plate current flowing through valve 15 and hence raising the potential at the plate of valve 15 and hence also at point 28'. This causes the positive grid voltage of valve 14 to rise, permitting more plate current to flow through valve 14, hence lowering the potential of the plate of valve 14 and, as a consequence, lowering the potential of point 28 still further. Thus this action is cumulative until the plate current of valve 15 has been cut completely off and valve 14 is carrying its full rated current, $I_m$. Owing to the very low time constants of the circuits, this action of transferring the entire current from valve 15 to valve 14 is completed in an extremely short time, such as a few millionths of a second or less.

In the meantime, as the amplified voltage $v_A$ further tends to increase beyond the value of the bias voltage of the battery in the right hand circuit of valve 24, the resistance of the right hand half of valve 24 operates to place a very low resistance in the plate circuit of the amplifier tube 23 and hence prevents the alternating component of the plate voltage from rising appreciably above the value of the voltage of the bias battery. Consequently no further rate of change of voltage is applied to condenser 30, and since the pulse circuit consisting of condenser 30 and resistor 29 is designed to have a very short time constant, the positive voltage placed on the grid of valve 25 in the interval near point $a$ quickly disappears and within a short time after point $a$ valve 25 is again in its original condition of current cut-off. Thus, the pulse and trigger circuits are again in a quiescent condition as before, the only difference being that valve 14 now carries the current instead of valve 15. When $v_B$ reaches point $b$, the right hand portion of the circuit consisting of elements 23', 24', 30', 29' and 25' operates to place a pulse of negative voltage at point 28', and the current is switched back to valve 15. Shortly thereafter, the central portion of the circuit becomes quiescent again and remains so until point $c$ of Fig. 1. At this point, there is a small interval during which valve 24 does not load valve 23, and a sudden high negative rate of change of voltage is applied to the pulse circuit 29—30 until the alternating component of the plate voltage of valve 23 exceeds the bias battery of the left hand half of valve 24. In this interval, a negative pulse of voltage is applied to the grid of tube 25, but since tube 25 is already biased to cut-off, this pulse has no effect on the voltage of point 28 and no switching action occurs so that the meter circuit is not affected.

Similarly, at point $d$, a negative pulse is applied to the grid of valve 25' but no change of voltage occurs at point 28'. Consequently, valve 15 continues to carry the current until point $a'$, when the cycle is repeated. Thus, it follows that the triggering action of valves 14 and 15 is similar to that illustrated by switch 5 of Figs. 5 and 6, and that this switching action has been provided with a workable means so that it conforms with the discussion accompanying Figs. 1 to 6. It is to be observed that elements 29 and 30 form a pulse circuit because of their relatively short time constant and because of the rectangular nature of the voltage wave applied to condenser 30 due to the action of the voltage limiting circuit. It should be noted that this current is especially adapted to measuring the phase difference or fractional time delay between waves consisting of successive periodic pulses, since the pulses may be applied directly to points 28 and 28' or to the grids of valves 25 and 25'.

The circuit of Fig. 8 has been somewhat refined in the structure of Figs. 9 and 10. The structure in these figures is essentially the same as shown in Fig. 8, except that amplifier tube 23 is preceded by a voltage limiter 32 to prevent this tube from overloading, i. e., being over-driven, and voltage limiter 32 in turn is preceded by another amplifier stage 33, a phase inverter 34 and a limiter 35. Similarly, the amplifier tube 23' is preceded by a voltage limiter 32', which in turn is preceded by an amplifier 33', which in turn is preceded by a phase inverter 34' and voltage limiter 35'. A switch 61 is shown connected for bypassing the phase inverter 34, in effect, when it is desired to change the scale readings by 180°. This is accomplished by moving switch 61 from its upper phase inverting position to its lower position, in which position no phase reversal of $v_A$ takes place as applied to tube 33, but since tube 34' still acts to reverse the phase of potential $v_B$ as applied to tube 33', the scale readings of meter 9' are changed by 180°. The operation of the circuit in Figs. 9 and 10 is otherwise similar to that of Fig. 8 and has been found highly satisfactory in use. It will be clear that any of the types of indicator shown in Fig. 4, 5 or 8 may be used in place of indicator 9', which is similar to that of Fig. 6.

In the form of the invention shown in Figs. 11 and 12, the system is adapted for measuring the phase angle between two radio frequency voltages of a frequency $f_H$, for example, that is beyond the range for which trigger circuits can be made to work satisfactorily. The lower half of Fig. 11 shows a phase difference indicator circuit of the type shown in Fig. 8, designed for any low frequency such as $f_L$ in the audio frequency range. The input voltages for this portion of the circuit are obtained by heterodyning the test and reference voltages against a locally generated radio frequency voltage supplied from oscillator 38, which generated voltage differs in frequency from the desired signals by an audio frequency $f_L$, as indicated in Fig. 11. As known to those skilled in this art, the phase relationship is preserved in the resulting audio voltages supplied to the phase difference indicator circuit. The sign of this audio phase difference is the same as that of the high frequency phase difference if the local oscillator is set at the frequency difference between frequency $f_H$ and frequency $f_L$ and is reversed if the local oscillator is set to the sum of the frequencies $f_H$ and $f_L$.

The circuit diagram of the structure of Fig. 11 is shown in detail in Fig. 12, wherein the output of the oscillator 38 is shown supplied to the radio frequency amplifiers and converters 39 and 39', the output of which is supplied to the amplifier tubes 23 and 23', respectively, of the phase difference indicator circuit. The meter 4' is shown used as in Fig. 5, meter 8 having been replaced by a resistance 50. It will be clear that any of the other types of indicator shown in Fig. 4, 6 or 8 may be used here.

In the form of the invention shown in Fig. 13, the voltage limiters and pulse circuits have been replaced by saturated core transformers in the plate circuits of tubes 23, 25 and 23', 25'. In this figure, transformers 40 and 41 have their primaries connected in the plate circuits of tubes 25 and 23. Either transformer 40 or 41 may be of the saturating core type, or both of these transformers may be of this type, if desired. The secondary winding of transformer 41 is connected in the grid circuit of tube 25, which would ordinarily be biased to cut-off, whereby negative pulses at c in Fig. 1 would not be reflected at the grid of tube 15', which grid is connected to point 28 through the secondary winding of the transformer 40. The connections for tubes 23' and 25' are similar to those for 23 and 25, the former having the primaries of saturable core transformers 41' and 40' in their plate circuits. The secondary winding of transformer 41' is connected to the grid of tube 25', whereas the secondary winding of transformer 40' is connected at one side to point 28' and at its other side to the grid of tube 14'.

In operation, when $v_A$ crosses the time axis at $a$, amplifier tube 23 will pass current producing a current pulse in the secondary winding of transformer 41, thereby biasing tube 25 on and producing a pulse in the secondary winding of transformer 40 to depress the potential of the grid of trigger tube 15', thereby shutting this tube off and triggering tube 14' on. Owing to the saturable nature of transformers 40 and 41, the voltages in their secondary circuits quickly drop off after the initial pulse voltage, but tube 14' continues to pass its rated current until potential $v_B$ passes point $b$ of Fig. 1, whereupon pulses from transformers 41' and 40' serve to reduce the potential on the grid of tube 14' and start the operation of tube 15' again.

The hook-up of meter or indicator 42 in Fig. 13 is similar to that of meter 8 in Fig. 5. The coil of meter 42 is shown operating a stencil 43 engaging a traveling tape or film 44 to produce a record of the phase difference. A relay 65 is shown connected in series with meter 42. This relay can be set so that the same will close when any derived phase difference between $V_A$ and $V_B$ has been reached, thereby effecting the lighting of pilot lamp 68 or perform any other desired operation. It will be clear that this indicator and recorder may be used with any of the circuits of Fig. 8, 10 or 12 or may be replaced by any of the indicators of Fig. 4, 5, 6 or 8.

A slight modification of the hook-up of the secondary winding of transformer 40 is shown in Fig. 14. In this figure one side of this winding is connected to ground and the other side through condenser 43' to point 28 so that when a pulse passes through the primary winding of transformer 40, the secondary is rendered conducting for a moment, thereby dropping the potential of point 28.

In Fig. 15, saturable core reactors 45 and 46 are substituted for the transformers 40 and 41 of Fig. 13. The operation of Fig. 15 is similar to that of Fig. 8. It will be clear here also that any of the indicators described above may be used with Figs. 14 and 15.

It is to be understood that the alternating potentials compared as above need not be pure sinusoidal potentials but may be any varying potentials adapted to have a phase difference.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for measuring the phase difference between two alternating voltages comprising current supply means, an indicator, and switching means controlled by said alternating voltages operating to connect said current supply means to said indicator only during periods beginning at a predetermined phase position of one of said voltages and terminating at the corresponding phase position of the other of said voltages.

2. Control apparatus responsive to the phase difference or fractional time delay between two periodic waves, comprising current supply means, a control device, switching means for connecting said current supply means to said device, and means energized by said periodic waves at the beginning and ending of periods obtaining between like time phase positions of said waves connected to control said switching means.

3. Control apparatus responsive to the phase difference between two periodic waves, comprising current supply means, a control device, and switching means controlled by said periodic waves for connecting said current supply means to said device at a particular time phase position of one of said waves and for disconnecting said current supply means from said device at the corresponding time phase position of said second wave.

4. Apparatus for measuring the phase difference between two periodic voltages comprising direct current supply means, an indicator of the current measuring type, and electronic switching means controlled from said periodic voltages and connected for switching current from said current supply means to said indicator during the interval between corresponding time phase positions of said two voltages.

5. Apparatus for measuring the phase difference between two periodic voltages comprising current supply means, indicating means, and electronic switching means controlled from said periodic voltages connected for switching current from said current supply means to said indicating means during the interval between corresponding time phase positions of said two voltages.

6. Apparatus for measuring the phase difference between two alternating voltages comprising a source of direct current supply, a differential meter having a pair of differential windings arranged to be fed from said supply, thermionic switching means for alternately connecting the windings of said meter to said current supply in accordance with the phase difference of said alternating voltages, and means for operating said switching means from said alternating voltages.

7. Apparatus for measuring the phase difference between two periodic waves, comprising a source of direct current supply, differential indicating means having a pair of inputs arranged to be fed from said supply, thermionic switching means for alternately connecting said inputs to said current supply in accordance with the phase difference of said waves, and means for operating said switching means from said waves.

8. Apparatus for measuring the phase difference between two alternating voltages comprising a source of direct current supply, a differential indicator having a pair of differential windings arranged to be fed from said supply, thermionic switching means for alternately connecting the windings of said indicator to said current supply in accordance with the phase difference of said alternating voltages, and means including pulse circuits for operating said thermionic switching means from said alternating voltages, whereby one of the windings of said indicator is supplied from said current source during one period of each cycle obtaining between corresponding phase positions of said alternating voltages and said other winding of said indicator is supplied from said current source during the remaining period of each cycle obtaining between corresponding phase positions of said alternating voltages.

9. Apparatus for measuring phase angles between two alternating voltages, comprising means for separately amplifying said voltages, pulse circuits controlled from said amplifying means, an indicator, a source of current supply, and thermionic relay means controlled from said pulse circuits and connected for intermittently connecting said current source to said indicator during intervals between corresponding phase positions of said voltages.

10. Apparatus for measuring the phase angle or time delay between two periodic waves, comprising pulse circuits controlled by said waves, an indicator, a source of current supply, and thermionic relay means controlled from said pulse circuits and connected for intermittently connecting said current source to said indicator during intervals between corresponding phase positions of said waves.

11. Apparatus for measuring phase angles between two alternating voltages, comprising means for separately amplifying said voltages, means for limiting the voltage output of said amplifying means, pulse circuits fed from said amplifying means, an indicator, a source of current supply, and thermionic relays controlled from said pulse circuits and connected for intermittently connecting said current source to said indicator during intervals between corresponding phase positions of said voltages.

12. Apparatus for measuring the phase angle or relative time delay between two periodic waves, comprising means for limiting the magnitude of said waves, pulse circuits energized from said limiting means, an indicator, a source of current supply, and thermionic relays controlled from said pulse circuits and connected for intermittently connecting said current source to said indicator during intervals between corresponding phase positions of said voltages.

13. Apparatus for measuring the phase angle or relative time delay between two periodic waves, comprising means for deriving pulses from said waves, an indicator, a source of current supply, and means controlled from said pulses and connected for intermittently connecting said current source to said indicator during intervals between corresponding phase positions of said waves.

14. Apparatus for measuring the phase difference between two radio frequency voltages, comprising a local radio frequency oscillator, means for heterodyning said radio frequency voltages with the output of said oscillator to produce audio frequency voltages having a phase difference corresponding to that between said radio frequency voltages, a current source, an indicator connected to said current source, switching means connected to said indicator and said current source, and means for controlling said switching means in response to the relative phase positions of said audio frequency voltages.

15. Apparatus responsive to the phase difference between two alternating potentials comprising pulse circuits controlled from said alternating potentials and responsive to phase positions of said potentials, swiching means connected to be triggered by said pulse circuits, and servo mechanism connected to be operated by said switching means upon the occurrence of a predetermined phase difference between said potentials.

16. The method of indicating the relative delay between two periodic waves, comprising the steps of causing energy derived from said waves to switch a control current on at a particular phase position of one of said waves and then causing energy derived from said waves to switch said control current off at a corresponding phase position of the other of said waves, equating the value of current flow to give an indication.

17. The method of indicating the relative delay between two periodic waves as in claim 16, further including the step of measuring the average value of said control current.

18. The method of producing a controlling force responsive to the relative delay between two periodic waves, comprising the steps of causing energy derived from one of said waves to initiate a current pulse of predetermined wave form at a particular phase position of one of said waves and causing energy derived from the other of said waves to terminate said pulse at the corresponding phase position of the other of said waves, translating the energy of said pulse to produce said controlling force.

19. The method of indicating the relative delay between two periodic waves, comprising the steps of causing energy derived from one of said waves to initiate a constant magnitude current pulse at a particular phase position of one of said waves and causing energy derived from the other of said waves to terminate said pulse at a corresponding phase position of the other of said waves, and equating the value of said pulse to give an indication.

20. The method of indicating the relative delay between two periodic waves as in claim 19, further including the step of measuring the average value of said current pulse.

21. The method of indicating the relative delay between two periodic waves comprising the steps of causing energy derived from said waves to produce an independent current pulse of predetermined wave form having a duration equal to the interval between corresponding phase positions of said waves and indicating the average value of said pulse.

22. The method of indicating the relative delay between two periodic waves comprising the steps of causing energy derived from said waves to produce an independent rectangular current pulse having a duration equal to the interval between like phase positions of said two waves and indicating the average value of said pulse.

23. Apparatus for measuring the phase difference or time lag between two periodic energy waves comprising current supply means, indicating means, and automatic switching means connected between said current supply means and said indicating means successively responsive to the respective energy waves at corresponding points displaced the amount of said phase difference or time lag for actuating said indicating means.

24. Apparatus for measuring the phase angle between two alternating current or voltage waves comprising current supply means, indicating means, and automatic switching means connected between said current supply means and said indicating means successively controlled by the respective currents or voltages during corresponding phase positions of the respective waves for actuating said indicating means.

25. The method of measuring the phase angle between two alternating voltages which comprises the steps of subjecting an indicating circuit to successive control operations automatically responsive to the respective waves at corresponding phase positions and indicating the interval between said operations.

26. Apparatus for measuring the phase difference between two periodic waves comprising a trigger circuit, indicating means for said circuit, and means individually connecting each of said waves to control said circuit so as to actuate said indicator successively at corresponding phase positions of the respective waves embodying means for converting said waves into substantially rectangular shape, and means connecting the outputs of said converting means to said trigger circuit.

27. Apparatus for measuring the phase difference between two periodic voltage waves comprising a trigger circuit, an indicator for said circuit, and means individually connecting each of said waves to control said circuit including voltage amplifying and limiting means and a pulse circuit responsive to energy derived from the respective wave and adapted to actuate said indicator successively at corresponding phase positions of said waves.

28. Apparatus for measuring the phase difference between two periodic voltage waves comprising a trigger circuit, an indicator for said circuit, means individually connecting each of said waves to control said circuit including a phase inverter, voltage amplifying and limiting means and a pulse circuit responsive to energy derived from the respective wave and adapted to actuate said indicator successively at corresponding phase positions of said waves, and means selectively rendering one of said phase inverters ineffective in order to shift the indicating range of said indicator.

JAMES E. SHEPHERD.

CERTIFICATE OF CORRECTION

Patent No. 2,370,692. March 6, 1945.

JAMES E. SHEPHERD.

It is hereby certified that error appears in the printed specification of the above numbered patent requiring correction as follows: Page 2, first column, line 33, after the word "very" insert --wide--; line 39, after "only" insert --one--; and second column, line 11, for "alterating" read --alternating--; and that the said Letters Patent should be read with this correction therein that the same may conform to the record of the case in the Patent Office.

Signed and sealed this 12th day of June, A. D. 1945.

Leslie Frazer (Seal) Acting Commissioner of Patents.